US008422096B2

United States Patent
Cui et al.

(10) Patent No.: US 8,422,096 B2
(45) Date of Patent: Apr. 16, 2013

(54) METHOD FOR DISSIPATING HEAT PRODUCED IN SCAN HEAD ASSEMBLY OF IMAGING APPARATUS

(75) Inventors: Chengwu Cui, Lexington, KY (US); Charles Brandon Langrel, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 745 days.

(21) Appl. No.: 12/329,697

(22) Filed: Dec. 8, 2008

(65) Prior Publication Data
US 2010/0142010 A1 Jun. 10, 2010

(51) Int. Cl.
*H04N 1/04* (2006.01)
(52) U.S. Cl.
USPC ............ 358/486; 358/474; 358/496; 358/497
(58) Field of Classification Search .................. 358/474, 358/496, 497, 498, 486, 401, 501, 505, 468; 399/94, 44, 367, 471, 18, 19
See application file for complete search history.

(56) References Cited

U.S. PATENT DOCUMENTS

| 7,256,914 | B1 * | 8/2007 | Chen et al. ............. | 358/497 |
| 7,719,728 | B2 * | 5/2010 | Harada ................. | 358/475 |
| 2002/0054383 | A1 * | 5/2002 | Sato et al. .............. | 358/504 |
| 2008/0205917 | A1 * | 8/2008 | Ito ..................... | 399/44 |

FOREIGN PATENT DOCUMENTS

| JP | 09062064 A | * | 3/1997 |
| JP | 09230775 A | * | 9/1997 |
| JP | 2000092279 A | * | 3/2000 |
| JP | 2001013599 A | * | 1/2001 |
| JP | 2005289626 A | * | 10/2005 |
| JP | 2006339778 A | * | 12/2006 |
| JP | 2008211635 A | * | 9/2008 |

\* cited by examiner

*Primary Examiner* — Cheukfan Lee
(74) *Attorney, Agent, or Firm* — John Victor Pezdek (57) ABSTRACT

Disclosed are a method and a computer program product for dissipating heat produced in a scan head assembly of an imaging apparatus during scanning of media sheets in the imaging apparatus. The method includes determining at least one of a temperature of the scan head assembly and a media sheet scan count. The method further includes moving the scan head assembly between a first position of the scan head assembly and a second position of the scan head assembly for dissipating heat, based on at least one of the temperature of the scan head assembly and the media sheet scan count.

10 Claims, 6 Drawing Sheets

METHOD FOR DISSIPATING HEAT PRODUCED IN SCAN HEAD ASSEMBLY OF IMAGING APPARATUS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to imaging apparatuses, and more particularly to a method for dissipating heat produced in a scan head assembly of an imaging apparatus.

2. Description of the Related Art

Imaging apparatuses, such as document scanners, are widely used for scanning printed media sheets and generating a digital image thereof. A conventional imaging apparatus includes a flatbed enclosure having a transparent board disposed on an open top end of the flatbed enclosure, and a scan head assembly disposed within the flatbed enclosure. The scan head assembly comprises a lamp, a plurality of mirrors, a plurality of lenses and a Charge Coupled Device (CCD). For carrying out scanning of a media sheet, the media sheet is placed on the transparent board in a manner such that a surface of the media sheet, which is to be scanned, is in contact with the transparent board. Thereafter, the lamp is utilized to illuminate the surface of the media sheet that is to be scanned. The plurality of mirrors and the plurality of lenses direct a light reflected from a portion of the surface of the media sheet onto the CCD. The CCD is adapted to generate an electronic image data of the surface of the media sheet from the light reflected therefrom. A typical scan head assembly may be moved along a length of the media sheet for scanning the entire media sheet and generating an electronic image data thereof.

For high speed scanning of a large number of media sheets, conventional imaging apparatus utilizes an automatic document feeder (ADF) assembly that is configured in an operative coupling with the scan head assembly of the conventional imaging apparatus. Such imaging apparatus may be preferably referred to as "ADF scanner". The ADF assembly of a typical ADF scanner is utilized to receive a plurality of media sheets for carrying out scanning thereof at high speed. More specifically, the ADF assembly includes a tray for receiving the plurality of media sheets and an associated media sheet moving mechanism that enables the scanning of the plurality of media sheets. In a typical ADF scanner, the media sheets are scanned by moving the media sheets over the scan head assembly one at a time such that the scan head assembly illuminates each of the media sheets and generates an electronic image data thereof More specifically, in the typical ADF scanner, the scan head assembly is stationary while the ADF assembly moves the media sheets received in the tray over the scan head assembly, in a manner such that one media sheet is moved over the scan head assembly at a time. Generally, the ADF assembly of the ADF scanner may receive a large number of media sheets, which may be scanned at a very high speed, for example at a speed of about 70 sheets per minute.

The high speed scanning enables a large number of media sheets to be scanned in a short span of time with minimum human involvement, thereby providing a cost-effective and less time-consuming solution for carrying out bulk scanning works. A typical high speed scanning requires more light to process images of the media sheets, which in turn requires more illumination of the media sheets for effective scanning. More illumination of the media sheets requires operating the lamp at a higher power, which leads to generation of more heat. Therefore, during the high speed scanning, there may result a temperature rise within the flatbed enclosure due to generation of more heat by the lamp. Further, a conventional flatbed enclosure is generally sealed to prevent entry of contaminants into the flatbed enclosures and accordingly, the heat produced within the flatbed enclosures may not be easily dissipated therefrom, thereby leading to a further rise in the temperature. A rise in temperature within the flatbed enclosure may result in rise in temperature of the scan head assembly. The working efficiency of the scan head assembly may be affected due to high temperature thereof, thereby resulting in decreased quality of scanning of the media sheets. Moreover, a prolonged exposure of the scan head assembly to a high temperature may result in shortening of life span thereof.

The flatbed enclosures may be provided with additional cooling mechanisms, such as cooling fins, cooling fans, and the like to enable the scan head assembly to dissipate heat. However, inclusion of additional cooling mechanisms may require the flatbed enclosures to be redesigned to accommodate the cooling mechanisms. Further, such cooling mechanisms need to be designed in a manner such that the cooling mechanisms adequately block the entry of contaminants into the flatbed enclosures. Moreover, inclusion of such cooling mechanisms may not be cost-effective and may increase an overall operating and maintenance cost of the imaging apparatus.

Accordingly, there persists a need to dissipate heat produced in a scan head assembly of an imaging apparatus, which overcomes the drawbacks and limitations of prior art imaging apparatuses. More specifically, there persists a need to dissipate heat produced in a scan head assembly of an imaging apparatus in a manner that precludes inclusion of additional cooling mechanisms in a flatbed enclosure of the imaging apparatus. Moreover, there persists a need to dissipate heat produced in a scan head assembly of an imaging apparatus in an easy, reliable and cost-effective manner.

SUMMARY OF THE INVENTION

In view of the foregoing disadvantages inherent in the prior art, the present disclosure provides a method for dissipating heat produced in a scan head assembly of an imaging apparatus by including all the advantages of the prior art and overcoming the drawbacks inherent therein.

Accordingly, in one aspect, the present disclosure provides a method for dissipating heat produced in a scan head assembly of an imaging apparatus during scanning of media sheets in the imaging apparatus. The imaging apparatus includes a flatbed enclosure for enclosing the scan head assembly. The method for dissipating heat includes determining at least one of a temperature of the scan head assembly and a media sheet scan count. The method further includes moving the scan head assembly between a first position of the scan head assembly and a second position of the scan head assembly for dissipating heat, based on at least one of the temperature of the scan head assembly and the media sheet scan count.

In another aspect, the present disclosure provides a method for dissipating heat produced in a scan head assembly of an imaging apparatus during scanning of media sheets in the imaging apparatus. The method includes determining at least one of a temperature of the scan head assembly and a media sheet scan count. The method further includes performing at least one heat dissipation cycle based on at least one of the temperature of the scan head assembly and the media sheet scan count. The at least one heat dissipation cycle includes moving the scan head assembly from a first position of the scan head assembly to a second position of the scan head assembly. Thereafter, the scan head assembly is moved from the second position of the scan head assembly to an intermediate position of the scan to head assembly. The intermediate position of the scan head assembly is a position located between the first position and the second position of the scan head assembly. Subsequently, the scan head assembly is moved from the intermediate position to the second position. Finally, the scan head assembly is moved from the second position to the first position to complete the heat dissipation cycle.

In yet another aspect, the present disclosure provides a computer program product embodied on a computer readable storage medium for dissipating heat produced in a scan head assembly of an imaging apparatus during scanning of media sheets in the imaging apparatus. The computer program product includes a program module having a set of instructions for determining at least one of a temperature of the scan head assembly and a media sheet scan count. The program module also includes a set of instructions for moving the scan head assembly between a first position of the scan head assembly and a second position of the scan head assembly for dissipating heat, based on at least one of the temperature of the scan head assembly and the media sheet scan count.

In still another aspect, the present disclosure provides a computer program product embodied on a computer readable storage medium for dissipating heat produced in a scan head assembly of an imaging apparatus during scanning of media sheets in the imaging apparatus. The computer program product includes a program module having a set of instructions for determining at least one of a temperature of the scan head assembly and a media sheet scan count. The program module also includes a set of instructions for performing at least one heat dissipation cycle based on at least one of the temperature of the scan head assembly and the media sheet scan count. The heat dissipation cycle includes moving the scan head assembly from a first position of the scan head assembly to a second position of the scan head assembly. Thereafter, the scan head assembly is moved from the second position of the scan head assembly to an intermediate position of the scan head assembly. The intermediate position of the scan head assembly is a position located between the first position and the second position of the scan head assembly. Subsequently, the scan head assembly is moved from the intermediate position to the second position. Finally, the scan head assembly is moved from the second position to the first position to complete the heat dissipation cycle.

BRIEF DESCRIPTION OF THE DRAWINGS

The above-mentioned and other features and advantages of the present disclosure, and the manner of attaining them, will become more apparent and the present invention will be better understood by reference to the following description of embodiments of the present disclosure taken in conjunction with the accompanying drawings, wherein.

DETAILED DESCRIPTION

It is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the disclosure include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the methods disclosed in the disclosure may be implemented in software. As such, it should be noted that a plurality of hardware and software-based devices, as well as a plurality of different structural components may be utilized to implement the disclosure. Furthermore, and as described in subsequent paragraphs, the specific configurations illustrated in the drawings are intended to exemplify embodiments of the disclosure and that other alternative configurations are possible.

Accordingly, the present disclosure provides various methods and computer program products for dissipating heat produced in a scan head assembly of an imaging apparatus. The methods, as described herein, facilitate dissipation of heat produced in the scan head assembly in an easy, reliable and cost-effective manner. The methods, as described herein, are initiated during a scanning operation of the imaging apparatus. The scanning operation may be described as scanning of a set of media sheets by the scan head assembly of the imaging apparatus. It will be evident to a person skilled in the art that the scan head assembly is at a fixed position, such as the first position for performing the scanning operation. Further, the scan head assembly may get heated during the scanning operation and may accordingly be required to dissipate heat during the scanning operation by initiating one of the disclosed methods. After dissipating heat produced in the scan head assembly, the scanning operation may be continued to scan remaining media sheets of the set of media sheets.

The term "temperature of the scan head assembly", as used hereinafter, refers to a value of temperature of the scan head assembly that is determined by a suitable temperature sensing means, such as a thermocouple, a thermistor, and the like. In an embodiment of the present disclosure, the temperature sensing means may be configured on a printed circuit board (PCB) of the scan head assembly. The PCB of the scan head assembly may include an electronic circuitry for controlling operations of the scan head assembly. In another embodiment of the present disclosure, the temperature sensing means may be configured on a separate PCB that is in communicable coupling with the PCB of the scan head assembly. It will be evident to a person skilled in the art that the temperature sensing means should be configured proximal to the scan head assembly for effectively determining the temperature thereof.

The term "media sheet scan count", as used hereinafter, refers to a count of media sheets, which are scanned consecutively by an imaging apparatus during a scanning operation. In the present disclosure, the media sheet scan count may be determined from a firmware of the imaging apparatus. Alternatively, the media sheet scan count may be determined by utilizing a media sheet scan counter that may be configured on the imaging apparatus.

Figure 1A:
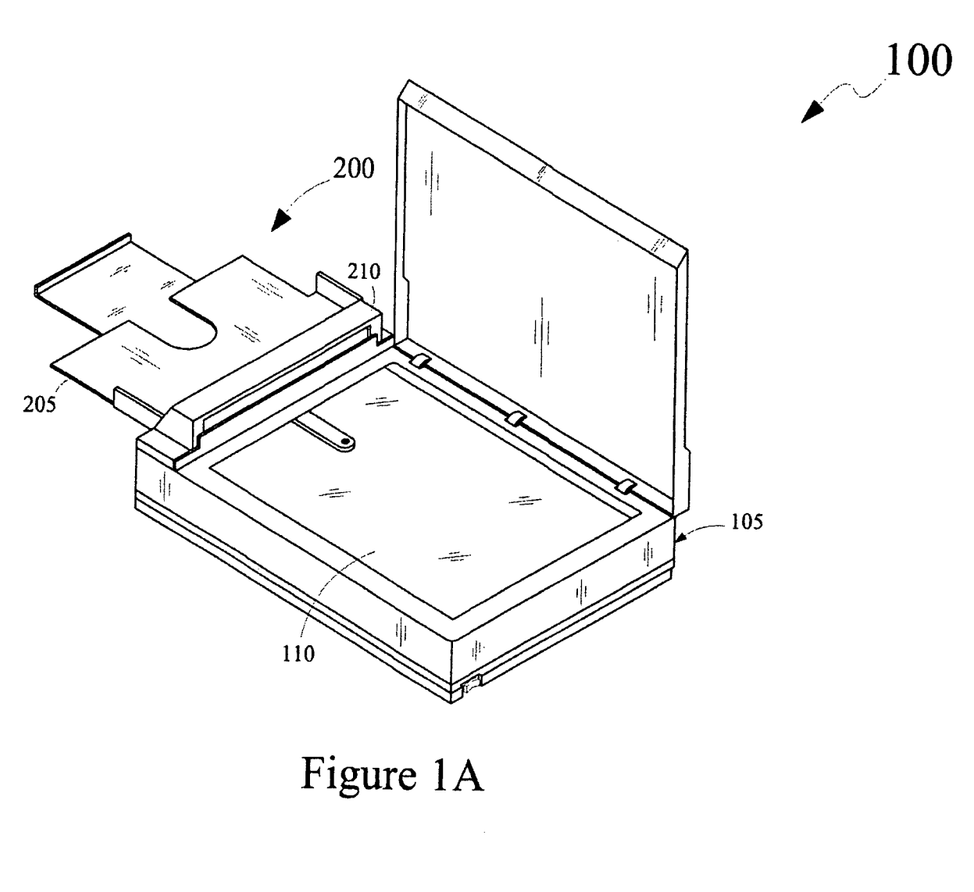
FIG. 1A illustrates a perspective view of an imaging apparatus in which the present invention is utilized.

Referring to FIG. 1A, a perspective view of an ADF scanner 100 is illustrated. ADF scanner 100 includes a flatbed enclosure 105, a transparent board 110 disposed on an open top end of flatbed enclosure 105 and an ADF assembly 200 configured on flatbed enclosure 105. As shown in FIG. 1A, ADF assembly 200 is configured at an end portion of flatbed enclosure 105. ADF assembly 200 includes a tray 205 adapted to receive a plurality of media sheets (not shown) thereon and an enclosure 210 having a media sheet moving mechanism configured therein. The media sheet moving mechanism is adapted to receive one media sheet at a time from tray 205, and thereafter, to move the media sheet through enclosure 210 for enabling scanning thereof. The media sheets are scanned by a scan head assembly (not shown) configured within flatbed enclosure 105 and normally disposed below enclosure 210 of ADF assembly 200.

Figure 1B:
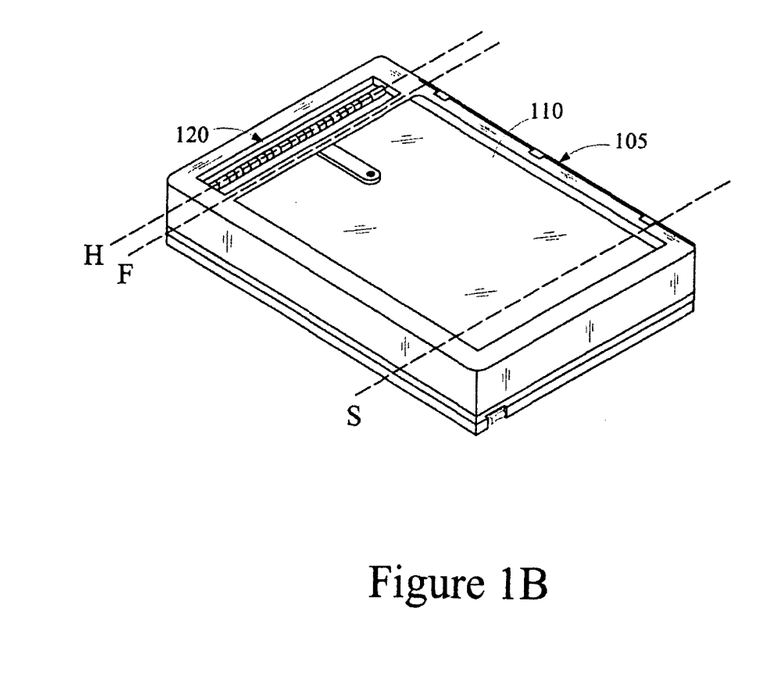
FIG. 1B illustrates a perspective view of a flat bed enclosure of the imaging apparatus of FIG. 1A.

Referring to FIG. 1B, a perspective view of ADF scanner 100 with ADF assembly 200 removed therefrom is illustrated. More specifically, FIG. 1B illustrates a scan head assembly 120 disposed within flatbed enclosure 105. As shown in FIG. 1B, the scan head assembly 120 assumes a home position (shown as 'H') that is at an extreme end portion of flatbed enclosure 105. The home position may be defined as a normal resting position of scan head assembly 120 when scan head assembly 120 is not being utilized for scanning of media sheets. For scanning of media sheets, scan head assembly 120 assumes a first position (shown as 'F'). The first position is separated from the home position by a first predetermined distance in a manner such that scan head assembly 120 is disposed below enclosure 210 of ADF assembly 200 when scan head assembly 120 assumes the first position. Scan head assembly 120 is adapted to move along a length of flatbed enclosure 105 to assume a second position (shown as 'S' in FIG. 1B) that is adjacent to another extreme end portion of flatbed enclosure 105. More specifically, the second position is separated from the home position of the scan head assembly by a predetermined distance. Preferably, the pre-determined distance may be equal to a length of flatbed enclosure 105.

In operation, the media sheets may be received on tray 205 of ADF assembly 200. Upon receiving an instruction to start scanning of the media sheets, scan head assembly 120 is moved from the home position to the first position. Thereafter, the media sheet moving mechanism of ADF assembly 200 moves the media sheets within enclosure 210, one media sheet at a time from tray 205, and over scan head assembly 120. Scan head assembly 120 illuminates a media sheet while the media sheet moves. A light reflected from the illuminated media sheet is received by a CCD of scan head assembly 120, which generates an electronic image data of the media sheet. The media sheets may be moved over scan head assembly 120 at a high speed to attain a high speed scanning thereof. During the scanning of the media sheets, scan head assembly 120 remains illuminated for a long time span, thereby producing heat.

Figure 2:
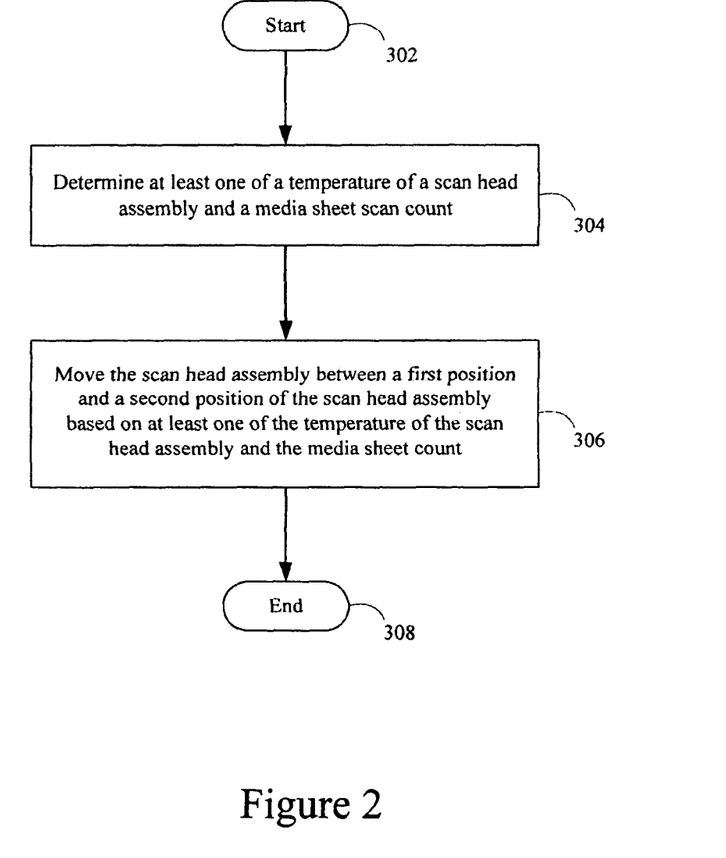
FIG. 2 illustrates a method for dissipating heat produced in a scan head assembly of an imaging apparatus, in accordance with an embodiment of the present disclosure.

Referring now to FIG. 2, a flow diagram illustrating a method for dissipating heat produced in a scan head assembly, such as scan head assembly 120, of an imaging apparatus, such as ADF scanner 100 is shown, in accordance with an embodiment of the present disclosure. The method for dissipating heat produced in the scan head assembly commences at 302 with the scan head assembly assuming the first position. More specifically, the method for dissipating heat is initiated while the scan head assembly is performing the scanning operation. Further, at 304, at least one of a temperature of the scan head assembly or a media sheet scan count is determined.

Thereafter, at 306, the scan head assembly is moved between the first position to the second position based on at least one of a value of the temperature of the scan head assembly and a value of the media sheet scan count determined at 304. Such a movement between the first position and the second position may be referred to as a "heat dissipation cycle". More specifically, in an embodiment of the present disclosure, the heat dissipation cycle may be performed when the determined value of the temperature of the scan head assembly at 304 is greater than a first threshold temperature. In another embodiment of the present disclosure, the heat dissipation cycle may be performed when the media sheet scan count is greater than a threshold count.

The movement of the scan head assembly between the first position and the second position in the heat dissipation cycle enables the scan head assembly to dissipate heat therefrom. More specifically, the scan head assembly is moved across a length of the flatbed enclosure between the first position and the second position. Moreover, the heat dissipation cycle may include movement of the scan head assembly in a multitude of movement patterns between the first position and the second position, such as a reciprocatory movement therebetween. One such exemplary movement pattern is explained in detail in conjunction with FIGS. 4 and 5. The movement of the scan head assembly in the heat dissipation cycle generates a turbulent air flow within the flatbed enclosure that enables the scan head assembly to dissipate heat. The generation of the turbulent airflow will be further explained in conjunction with FIG. 5.

After performing the heat dissipation cycle at 306, the method concludes at 308 by enabling the scan head assembly to assume the first position thereof for resuming the scanning operation.

In an embodiment of the present disclosure, the heat dissipation cycle may be repeated a multiple number of times depending upon whether the scan head assembly has been sufficiently cooled by initiating a single heat dissipation cycle. Such a repetition of the heat dissipation cycle is explained in conjunction with FIG. 3. Referring now to FIG.

Figure 3:
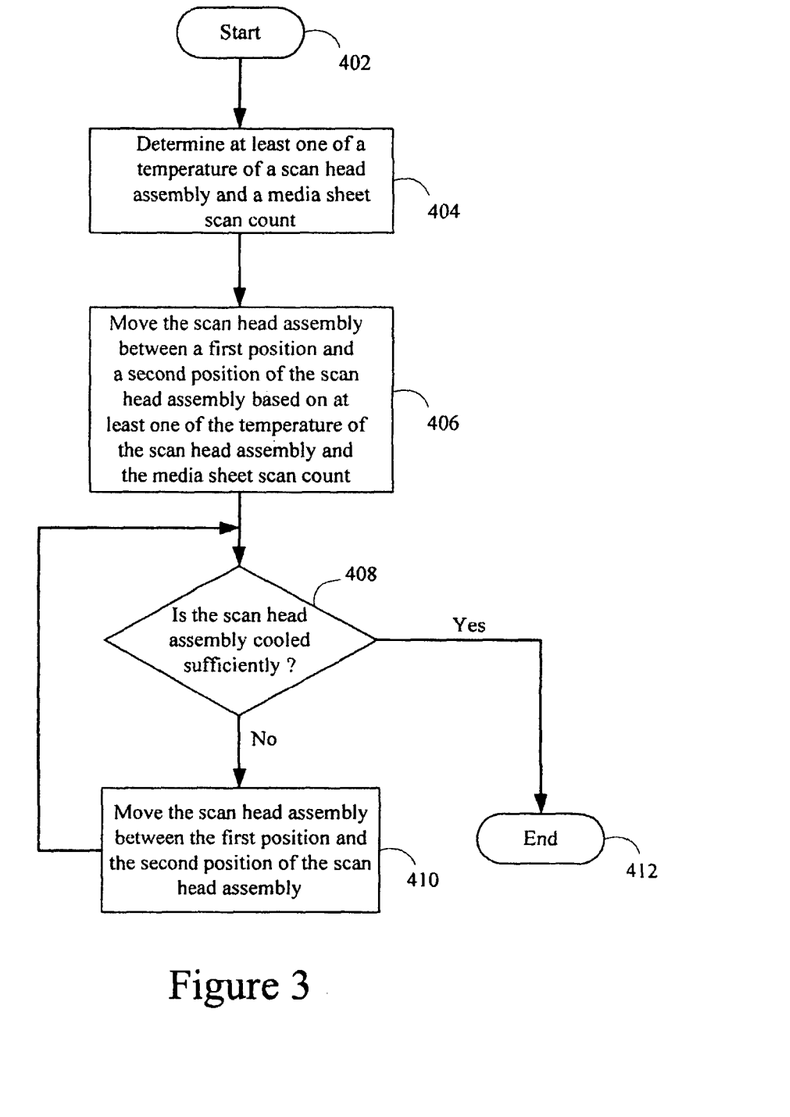
FIG. 3 illustrates a method for dissipating heat produced in a scan head assembly of an imaging apparatus, in accordance with another embodiment of the present disclosure.

3, a flow diagram for a method for dissipating heat produced in a scan head assembly of an imaging apparatus is shown, in accordance with another embodiment of the present disclosure. The method for dissipating heat commences at 402 with the scan head assembly assuming the first position. More specifically, the method of the present embodiment commences while the imaging apparatus is performing the scanning operation. At 404, at least one of a temperature of the scan head assembly, and a media sheet scan count during the scanning operation is determined.

Based on at least one of the temperature of the scan head assembly and the media sheet scan count, the scan head assembly is moved between the first position and the second position of the scan head assembly, at 406. The movement of the scan head assembly between the first position and the second position, hereinafter referred to as "heat dissipation cycle", generates a turbulent air flow within the flatbed enclosure, thereby enabling the scan head assembly to dissipate heat. In an embodiment of the present disclosure, the heat dissipation cycle may be performed when the temperature of the scan head assembly, determined at 404, is greater than a first threshold temperature. In another embodiment of the present disclosure, the heat dissipation cycle may be performed when the media sheet scan count is greater than a threshold count. After performing the heat dissipation cycle, the scan head assembly may assume the first position to complete the scanning operation.

However, the scan head assembly may not be cooled sufficiently after performing a single heat dissipation cycle. Accordingly, the heat dissipation cycle may be performed a multiple number of times for enabling sufficient cooling of the scan head assembly. Therefore, at 408, upon completing a head dissipation cycle at 406, it is determined whether the scan head assembly has sufficiently cooled. In an embodiment of the present disclosure, the determination of whether the scan head assembly has cooled sufficiently is carried out by comparing the temperature of the scan head assembly after the heat dissipation cycle with a second threshold temperature. It will be evident to a person skilled in the art that the temperature of the scan head assembly may be determined after or during each heat dissipation cycle. Upon determining that the temperature of the scan head assembly is greater than the second threshold temperature, a subsequent heat dissipation cycle is performed at 410 by moving the scan head assembly between the first position and the second position. The subsequent heat dissipation cycle may include movement of the scan head assembly in a movement pattern similar to that of the heat dissipation cycle at 406. However, the subsequent heat dissipation cycle may also include other movement patterns of the scan head assembly within the flatbed enclosure. Further, the subsequent heat dissipation cycle at 410 may be repeated as long as the temperature of the scan head assembly is greater than the second threshold temperature.

In another embodiment of the present disclosure, the determination of whether the scan head assembly has cooled sufficiently is carried out by determining time spent in performing multiple heat dissipation cycles. A person skilled in the art would appreciate that the present disclosure assumes that sufficient cooling of the scan head assembly has been performed, when the time spent in performing the multiple heat dissipation cycles is equal to or greater than a threshold time. Therefore, upon determining the time spent in the multiple heat dissipation cycles to be less than the threshold time, a subsequent heat dissipation cycle may be performed at 410. The subsequent heat dissipation cycle to a heat dissipation cycle is performed as long as a total time spent in the heat dissipation cycles, which are already performed is less than the threshold time. It will be evident to a person skilled in the art that the total time spent in the heat dissipation cycle includes a sum of the time spent in the heat dissipation cycle at 406 and the subsequent heat dissipation cycles at 410.

After every heat dissipation cycle, it is determined at 408 that whether sufficient cooling of the scan head assembly has been achieved. When it is determined at 408 that the scan head assembly has cooled sufficiently, the method concludes at 412 with the scan head assembly assuming the first position for resuming the scanning operation. Accordingly, the method of the present embodiment enables the scan head assembly to dissipate heat sufficiently by utilizing turbulent air flow.

The method of the present embodiment may be implemented in the imaging apparatus in form of a software or firmware. Accordingly, in an embodiment of the present disclosure, a computer program product is provided for enabling dissipation of heat produced in the scan head assembly of the imaging apparatus. The computer program product is embodied on a computer readable storage medium and includes a program module having a set of instructions for determining at least one of the temperatures of the scan head assembly and the media sheet scan count. Further, the program module includes set of instructions for performing the heat dissipation cycle by moving the scan head assembly between the first position and the second position of the scan head assembly based on at least one of the temperature of the scan head assembly and the media sheet scan count. More specifically, in an embodiment of the present disclosure, the heat dissipation cycle is performed when the temperature of the scan head assembly is greater than the first threshold temperature. In the present embodiment, the heat dissipation cycle may be repeated as long as the temperature of the scan head assembly is greater than the second threshold temperature. After the heat dissipation cycle concludes the scan head assembly assumes the first position. Accordingly, the program module includes a set of instructions for enabling the scan head assembly to move to the first position when the temperature of the scan head assembly is less than the second threshold temperature.

In another embodiment of the present disclosure, the heat dissipation cycle may be performed when the media sheet scan count is greater than the threshold count. In the present embodiment, the heat dissipation cycle may be repeated as long as the time spent in the heat dissipation cycle is less than the threshold time. After the heat dissipation cycle concludes, the scan head assembly assumes the first position. Accordingly, the program module includes a set of instructions for enabling the scan head assembly to move to the first position when time spent in the heat dissipation cycle is less than the threshold time.

Figure 4:
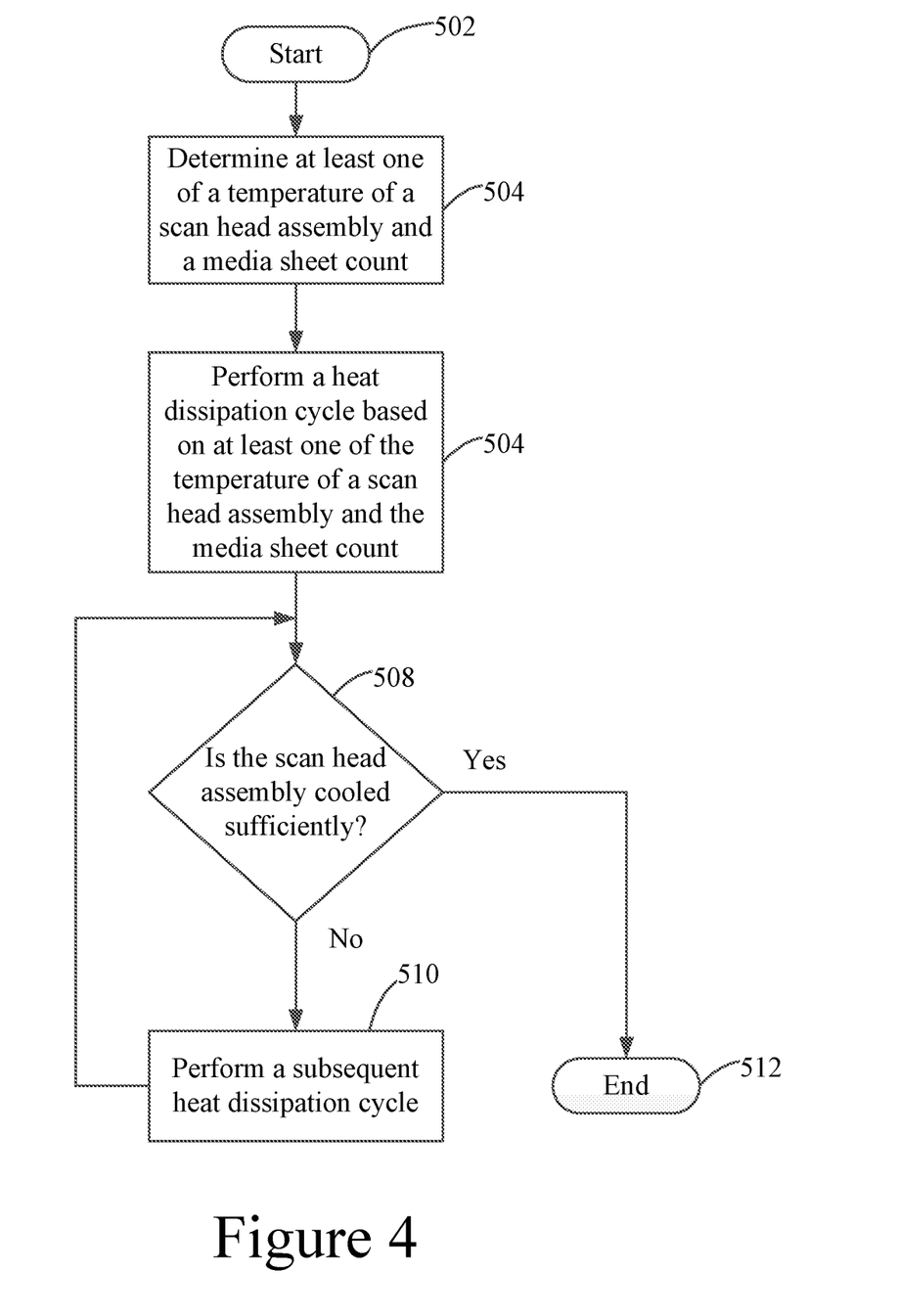
FIG. 4 illustrates a method for dissipating heat produced in a scan head assembly of an imaging apparatus, in accordance with yet another embodiment of the present disclosure.

Referring now to FIG. 4, a flow diagram representing a method for dissipating heat produced in a scan head assembly of an imaging apparatus, in accordance with another embodiment of the present disclosure is shown. The method for dissipating heat commences at 502 with the scan head assembly assuming the first position. More specifically, the method for dissipating heat is initiated while the scan head assembly is performing the scanning operation. At 504, at least one of a temperature of the scan head assembly and a media sheet scan count is determined. Based on at least one of the temperature of the scan head assembly and the media sheet scan count, a heat dissipation cycle is performed at 506. In an embodiment of the present disclosure, the heat dissipation cycle may be performed when the temperature of the scan head assembly is greater than a first threshold temperature. In another embodiment of the present disclosure, the heat dissipation cycle may be performed when the media sheet scan count is greater than a threshold count.

The heat dissipation cycle includes movement of the scan head assembly from the first position to the second position of the scan head assembly. Thereafter, the scan head assembly is moved from the second position to an intermediate position, which is preferably located substantially at a middle position between the first position and the second position. Subsequently, the scan head assembly is moved from the intermediate position to the second position and finally from the second position to the first position to conclude the heat dissipation cycle. The movement of the scan head assembly during the heat dissipation cycle will be described in conjunction with FIG. 5.

The various movements of the scan head assembly in the heat dissipation cycle generate a turbulent airflow within the flatbed enclosure, thereby causing the scan head assembly to dissipate heat effectively. The movement of the scan head assembly between the various positions may be preferably carried out at a desired speed of movement of the scan head assembly for enabling better heat dissipation by the scan head assembly. However, a single heat dissipation cycle may not enable the scan head assembly to completely dissipate heat. Accordingly, the heat dissipation cycle may be repeated a multiple number of times.

Based on the foregoing, at 508, it is determined whether sufficient cooling of the scan head assembly is achieved by the heat dissipation cycle at 506. In an embodiment of the present disclosure, the determination whether sufficient cooling has been achieved after performing the heat dissipation cycle at 506 is carried out by comparing the temperature of the scan head assembly to a second threshold temperature. Upon determining the temperature of the scan head assembly to be greater than the second threshold temperature, a subsequent heat dissipation cycle is performed at 510. The temperature of the scan head assembly is determined after every subsequent heat dissipation cycle and compared with the second threshold temperature. A subsequent heat dissipation cycle at 510 is performed as long as the temperature of the scan head assembly is greater than the second threshold temperature.

In another embodiment of the present disclosure, the determination whether sufficient cooling has been achieved is carried out by comparing a time spent in the heat dissipation cycle performed at 506 with a threshold time. The time spent in the heat dissipation cycle may be determined by calculating a time period between an instance when the heat dissipation cycle starts (referred to as "start time") and an instance when the heat dissipation cycle concludes (referred to as "completion time"). Upon determining the time spent between the start time and the completion time to be less than the threshold time, a subsequent heat dissipation cycle of the last heat dissipation cycle is performed at 510. The time spent in the subsequent heat dissipation cycle is determined in a manner similar to that of the heat dissipation cycle at 506. A total time spent in the heat dissipation cycle of the scan head assembly is determined as a sum of the time spent in the heat dissipation cycle at 506 and the subsequent at least one heat dissipation cycle performed at 510.

More specifically, the total time spent in the heat dissipation cycles at 506 and 510 represent a time period between the start time of the first heat dissipation cycle (at 506) and the completion time of the last heat dissipation cycle of the at least heat dissipation cycle (at 510). The total time spent is compared with the threshold time and a subsequent heat dissipation cycle is further performed when the total time spent in the heat dissipation cycles at 506 and 510 is less than the threshold time. It will be evident to a person skilled in the art that the total time spent is incremented by a value of the time spent in a subsequent heat dissipation cycle, when the subsequent heat dissipation cycle is performed. A subsequent heat dissipation cycle at 510 is performed as long as the total time spent in the heat dissipation cycles at 506 and 510 is less than the threshold time.

A person skilled in the art would appreciate the fact that at 508, the present disclosure provides determining whether the scan head assembly is cooled sufficiently after every heat dissipation cycle performed at 510. When it is determined at 508 that the scan head assembly has been cooled sufficiently, the method concludes at 512. Accordingly, the scan head assembly may perform multiple heat dissipation cycles to effectively dissipate heat therefrom. It will be evident to a person skilled in the art that at 512, the scan head assembly assumes the first position to restart the scanning operation.

The present embodiment may be implemented in form of software or a firmware of the imaging apparatus. Accordingly, in an embodiment of the present disclosure, a computer program product is provided for enabling dissipation of heat produced in the scan head assembly of the imaging apparatus. The computer program product is embodied on a computer readable storage medium and includes a program module having a set of instructions for determining at least one of the temperatures of the scan head assembly and the media sheet scan count. Further, the program module includes set of instructions for performing the heat dissipation cycle based on at least one of the temperature of the scan head assembly and the media sheet scan count. The heat dissipation cycle includes movement of the scan head assembly from the first position to the second position of the scan head assembly. Thereafter, the scan head assembly is moved from the second position to an intermediate position, which is preferably located substantially in middle of the first position and the second position. Subsequently, the scan head assembly is moved from the intermediate position to the second position and finally from the second position to the first position to conclude the heat dissipation cycle.

The computer program product further includes a set of instructions for comparing the temperature of the scan head assembly to a second threshold temperature upon performing each heat dissipation cycle of the at least one heat dissipation cycle. Furthermore, the computer program product includes a set of instructions for performing a subsequent heat dissipation cycle to the each heat dissipation cycle when the temperature of the scan head assembly is greater than a second threshold temperature. Moreover, the computer program product includes a set of instructions for comparing a time spent between a start time and a completion time of the at least one heat dissipation cycle to a threshold time. Additionally, the computer program product includes a set of instructions for performing a subsequent heat dissipation cycle to the at least one heat dissipation cycle when the time spent is less than the threshold time.

It would be apparent to a person skilled in the art that the term "first threshold temperature", as used hereinbefore, may be a predetermined value of temperature of the scan head assembly selected based on a heating rate of the scan head assembly. Alternatively, the first threshold temperature may be selected as a maximum value of temperature, to which the temperature of the scan head assembly may reach, while ensuring a safe scanning of the media sheets. For example, in an exemplary imaging apparatus, the temperature of the scan head assembly may reach about 70 degrees centigrade on performing about 100 minutes of continuous scanning for the safe scanning operations. Accordingly, the first threshold temperature of the scan head assembly may be set to about 70 degrees centigrade such that upon reaching the first threshold temperature, the scan head assembly starts the heat dissipation cycle.

Furthermore, the term "second threshold temperature", as used hereinbefore, may be a second predetermined value of the temperature of the scan head assembly. The second predetermined value may be selected based upon a desired cooling of the scan head assembly. For example, for an exemplary imaging apparatus for which the first threshold temperature is 70 degrees centigrade, the second threshold temperature may be selected as about 60 degrees centigrade for enabling sufficient cooling of the scan head assembly.

Moreover, the term "threshold count", as used hereinabove, may be a predetermined value for the media sheet scan count. The predetermined value may be determined based upon a heating rate of the scan head assembly. For example, in an exemplary imaging apparatus, it may be observed that the scan head assembly is required to dissipate heat after the scan head assembly has scanned about 100 media sheets continuously. Accordingly, the threshold count may be selected as about 100 media sheets; however the value of the threshold count will vary based on individual applications.

Figure 5:
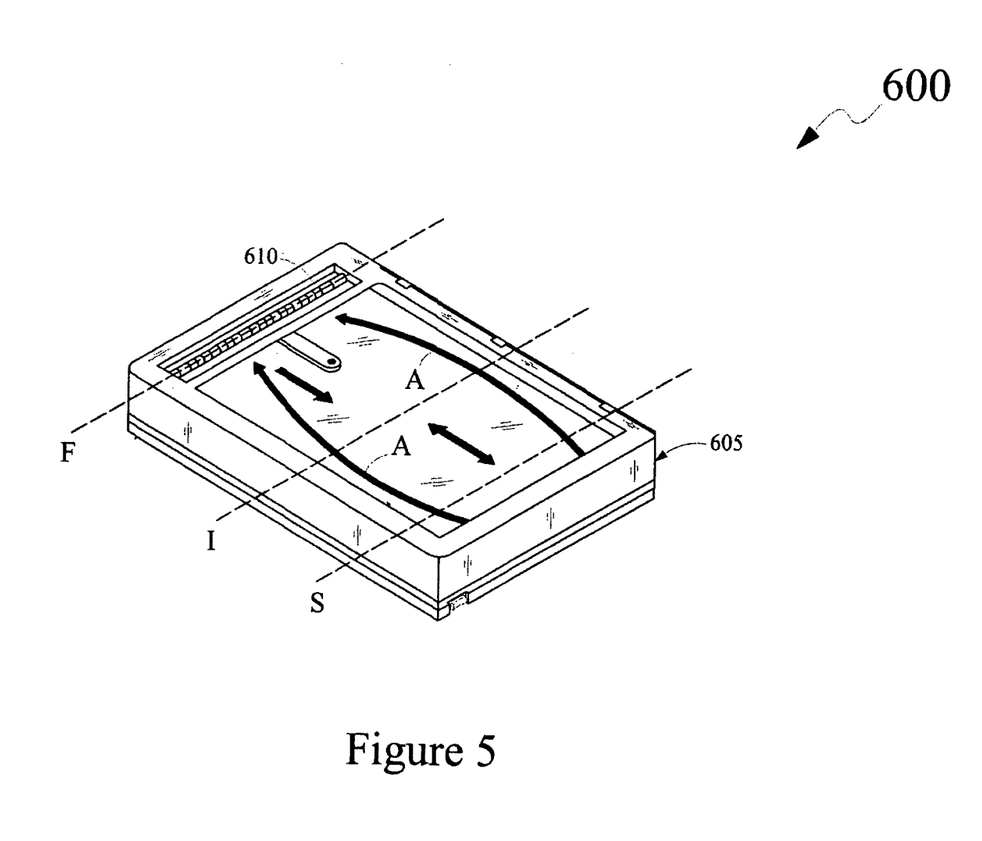
FIG. 5 illustrates a movement pattern of the scan head assembly for the method of FIG. 4.

Referring now to FIG. 5, a movement pattern of a scan head assembly during a beat dissipation cycle for the method described in conjunction with FIG. 4 is illustrated. FIG. 5 illustrates an ADF scanner 600 having a flatbed enclosure 605, similar to the flat bed enclosure 105, housing a scan head assembly 610, similar to scan head assembly 120, therein. Scan head assembly 610 is at the first position (shown as 'F' in FIG. 5) for performing scanning operation. Upon determining that scan head assembly 610 is required to dissipate heat, the heat dissipation cycle is initiated by moving scan head assembly 610 from the first position to the second position (shown as 'S' in FIG. 5). Thereafter, scan head assembly 610 is moved from the second position to an intermediate position (shown as 'I' in FIG. 5). It will be evident from FIG. 5 that the intermediate position is located substantially in middle of the first position and the second position. Further, scan head assembly 610 is subsequently moved from the intermediate position to the second position and finally scan head assembly 610 is moved from the second position to the first position to complete the heat dissipation cycle. The movement of scan head assembly 610, as described above, generates a turbulent airflow (shown as 'A' in FIG. 5) that cools scan head assembly 610, thereby enabling effective heat dissipation from scan head assembly 610. After completion of the heat dissipation cycle, scan head assembly 610 may complete the scanning operation if scan head assembly 610 has been cooled sufficiently by the heat dissipation cycle. Alternatively, a subsequent heat dissipation cycle may be performed if scan head assembly 610 has not been cooled sufficiently by the heat dissipation cycle. Without limiting the scope of the present disclosure, the subsequent heat dissipation cycle may include a movement pattern of scan head assembly 610 similar to that in the heat dissipation cycle.

Accordingly, the present disclosure provides various methods that may be utilized for effectively dissipating heat produced in a scan head assembly of an imaging apparatus. More specifically, various embodiments of the present disclosure may be advantageously used to effectively cool the scan head assembly of the imaging apparatus in an easy and reliable manner. Further, the present disclosure precludes the need to incorporate additional cooling mechanisms in a flatbed enclosure of the imaging apparatus for effectively cooling the scan head assembly configured therein. Accordingly, the present invention enables the scan head assembly to dissipate heat in a cost-effective manner. Moreover, the disclosed methods prevent shortening of life of the scan head assembly by enabling the scan head assembly to cool effectively by dissipating heat therefrom. However, to improve the effect of heat dissipation, a flatbed enclosure, such as flatbed enclosure 105, of an imaging apparatus utilizing the disclosed methods may be designed with a thermally conductive material, such as sheet metal, for enabling better heat transfer from the flatbed enclosure.

The foregoing description of several methods of the present disclosure has been presented for purposes of illustration. It is not intended to be exhaustive or to limit the disclosure to the precise steps and/or forms disclosed, and obviously many modifications and variations are possible in light of the above teaching. It is intended that the scope of the disclosure be defined by the claims appended hereto.

What is claimed is:

1. A method for dissipating heat produced in a scan head assembly of an imaging apparatus during scanning of media sheets, comprising:
   determining a media sheet scan count;
   moving the scan head assembly between a first position of the scan head assembly and a second position of the scan head assembly for dissipating heat when the media sheet scan count is greater than a threshold count;
   comparing a time spent in moving the scan head assembly between the first and second positions to a threshold time; and
   repeating the moving of the scan head assembly between the first and second positions as long as the time spent is less than the threshold time.

2. The method of claim 1, further comprising returning the scan head assembly for the scanning of media sheets to the first position when a total time spent in the movement of the scan head assembly between the first position and the second position is equal to or greater than the threshold time.

3. The method of claim 1, wherein the moving the scan head assembly includes moving the scan head assembly one or more times in a reciprocating manner between the first and second positions.

4. The method of claim 1, wherein the moving the scan head assembly includes:
   moving the scan head assembly from the first position to the second position;
   moving the scan head assembly from the second position to an intermediate position between the first and second positions;
   moving the scan head assembly from the intermediate position to the second position; and
   moving the scan head assembly from the second position to the first position.

5. A method for dissipating heat produced in a scan head assembly of an imaging apparatus during scanning of media sheets, comprising:
   determining a media sheet scan count;
   performing at least one heat dissipation cycle when the media sheet scan count is greater than a threshold count, wherein performing a heat dissipation cycle comprises:
      moving the scan head assembly from a first position of the scan head assembly to a second position of the scan head assembly,
      moving the scan head assembly from the second position of the scan head assembly to an intermediate position of the scan head assembly between the first position and the second position of the scan head assembly, moving the scan head assembly from the intermediate position of the scan head assembly to the second position of the scan head assembly, and moving the scan head assembly from the second position of the scan head assembly to the first position of the scan head assembly;

comparing a time spent between a start time and a completion time of the at least one heat dissipation cycle to a threshold time; and performing a subsequent heat dissipation cycle to the at least one heat dissipation cycle when the time spent is less than the threshold time.

6. A non-transitory computer readable storage medium containing instructions for dissipating heat produced in a scan head assembly of an imaging apparatus during scanning of media sheets by:

determining a media sheet scan count;

moving the scan head assembly between a first position of the scan head assembly and a second position of the scan head assembly for dissipating heat when the media sheet scan count is greater than a threshold count;

comparing a time spent in moving the scan head assembly between the first and second positions to a threshold time; and repeating the moving of the scan head assembly between the first and second positions as long as the time spent is less than the threshold time.

7. The computer readable storage medium of claim 6, further comprising instructions for returning the scan head assembly for the scanning of media sheets to the first position when a total time spent in the movement of the scan head assembly between the first position and the second position is equal to or greater than the threshold time.

8. The computer readable storage medium of claim 6, wherein the moving the scan head assembly between the first and second positions includes moving the scan head assembly one or more times in a reciprocating manner between the first and second positions.

9. The computer readable storage medium of claim 6, wherein the moving the scan head assembly includes:

moving the scan head assembly from the first position to the second position;

moving the scan head assembly from the second position to an intermediate position between the first and second positions;

moving the scan head assembly from the intermediate position to the second position; and moving the scan head assembly from the second position to the first position.

10. A non-transitory computer readable storage medium containing instructions for dissipating heat produced in a scan head assembly of an imaging apparatus during scanning of media sheets in the imaging apparatus by:

determining a media sheet scan count;

performing at least one heat dissipation cycle when the media sheet scan count is greater than a threshold count, wherein performing a heat dissipation cycle comprises:

moving the scan head assembly from a first position of the scan head assembly to a second position of the scan head assembly, moving the scan head assembly from the second position of the scan head assembly to an intermediate position of the scan head assembly between the first position and the second position of the scan head assembly, moving the scan head assembly from the intermediate position of the scan head assembly to the second position of the scan head assembly, and moving the scan head assembly from the second position of the scan head assembly to the first position of the scan head assembly;

comparing a time spent between a start time and a completion time of the at least one heat dissipation cycle to a threshold time; and performing a subsequent heat dissipation cycle to the at least one heat dissipation cycle when the time spent is less than the threshold time.

\* \* \* \* \*